US009237021B2

(12) United States Patent
Mills et al.

(10) Patent No.: US 9,237,021 B2
(45) Date of Patent: Jan. 12, 2016

(54) CERTIFICATE GRANT LIST AT NETWORK DEVICE

(71) Applicant: Hewlet-Packard Development Company, L.P., Houston, TX (US)

(72) Inventors: Craig Joseph Mills, Roseville, CA (US); Kaushik Datta, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 117 days.

(21) Appl. No.: 13/895,553

(22) Filed: May 16, 2013

(65) Prior Publication Data

US 2014/0281503 A1  Sep. 18, 2014

(30) Foreign Application Priority Data

Mar. 15, 2013  (IN) .............................. 772/DEL/2013

(51) Int. Cl.
*H04L 9/32* (2006.01)
*H04L 29/06* (2006.01)

(52) U.S. Cl.
CPC ............ *H04L 9/3263* (2013.01); *H04L 9/3268* (2013.01); *H04L 63/0823* (2013.01); *H04L 63/166* (2013.01)

(58) Field of Classification Search
None
See application file for complete search history.

(56) References Cited

U.S. PATENT DOCUMENTS

| 6,038,563 | A | 3/2000 | Bapat et al. |
| 6,510,513 | B1* | 1/2003 | Danieli ......................... 713/156 |
| 6,970,862 | B2 | 11/2005 | Kwan |
| 7,114,175 | B2 | 9/2006 | Lahteenmaki |
| 7,565,536 | B2 | 7/2009 | Vassilev et al. |
| 2003/0079125 | A1* | 4/2003 | Hope et al. .................... 713/156 |
| 2005/0069136 | A1* | 3/2005 | Thornton et al. ............. 380/277 |
| 2008/0189772 | A1* | 8/2008 | Sims et al. ........................ 726/5 |
| 2010/0257358 | A1 | 10/2010 | Grajek et al. |

FOREIGN PATENT DOCUMENTS

WO   WO2006/103646   10/2006

OTHER PUBLICATIONS

"Certificate Authority Server," Chapter 20, Cisco Router and Security Device Manager 2.5 User's Guide, 2007. <http://www.cisco.com/en/US/docs/routers/access/cisco_router_and_security_device_manager/25/software/user/guide/CAserv.html>.

* cited by examiner

*Primary Examiner* — David Le
(74) *Attorney, Agent, or Firm* — Hewlett Packard Enterprise Patent Department

(57) ABSTRACT

A certificate grant list is provided. The certificate grant list may be stored in a memory, at the network device. The certificate grant list may store information associated with a client-device certificate, where the client-device certificate permits the client-device access to a secure service.

12 Claims, 7 Drawing Sheets

CERTIFICATE GRANT LIST AT NETWORK DEVICE

BACKGROUND

The advent of information technology has led to an exponential growth in data communication over the Internet and other networks. In a network, network devices, such as network switches, provide a variety of network-based services. Applications hosted in client devices, such as servers, communicate with the network devices, over the network, to access such services.

BRIEF DESCRIPTION OF DRAWINGS

The detailed description is provided with reference to the accompanying figures. In the figures, the left-most digit(s) of a reference number identifies the figure in which the reference number first appears.

DETAILED DESCRIPTION

Figure 1:
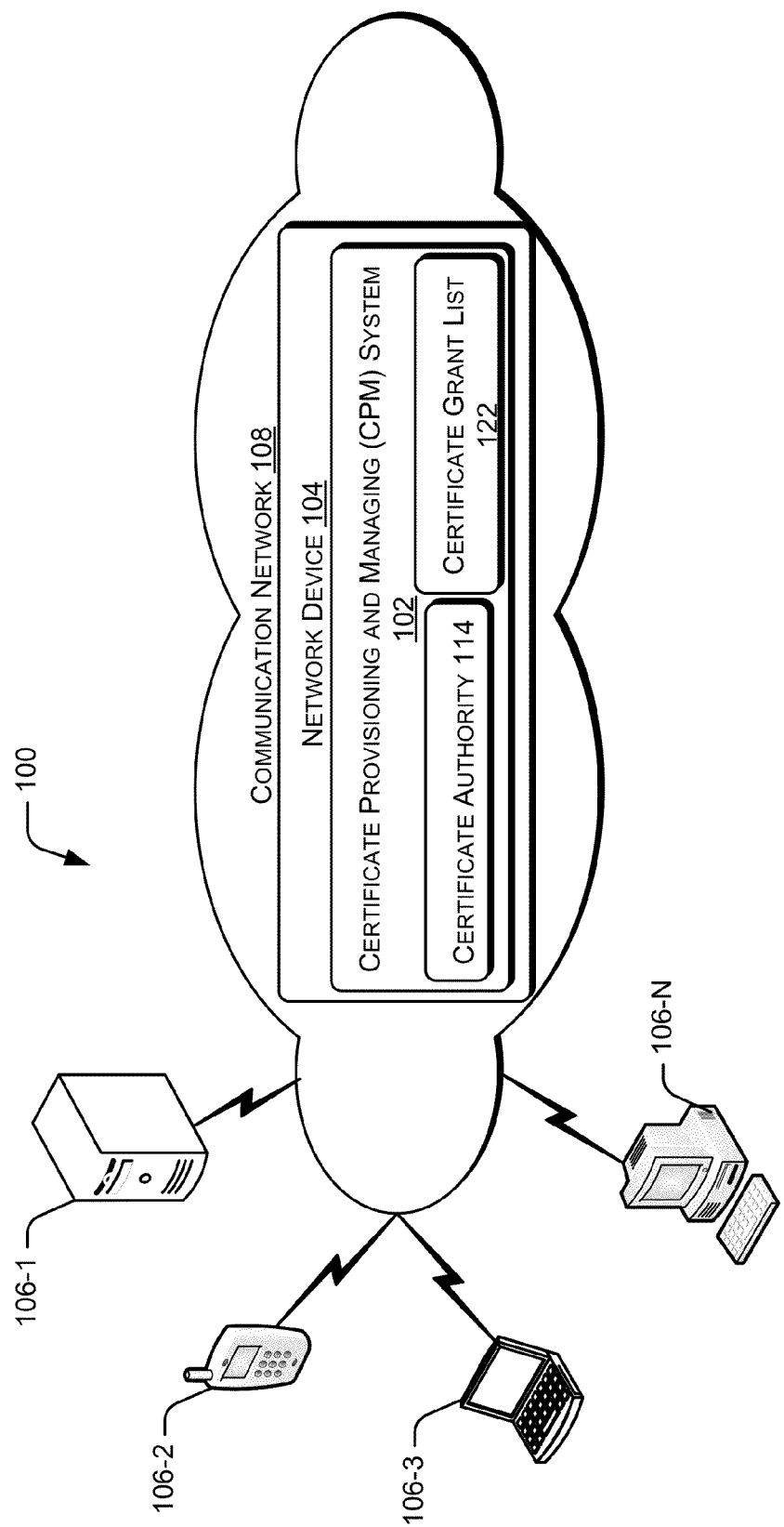
FIG. 1 illustrates a networking environment implementing a certificate provisioning and managing system in a network device, according to an example of the present subject matter.

The present subject matter relates to systems and methods for provisioning and managing of certificates for accessing secure services in a network.

Some services from a network device in a network are secure services for which the data provided to client devices may be private and confidential in nature. Typically, the communication between the network device and the client devices for accessing of secure services is not substantially secure. The network device is unable to establish a trust relationship with the client devices, that is, the network device is unable to establish a trust that the client devices are what they claim to be.

Trust relationships are typically established between client devices and servers hosting secure services by providing certificates to the client devices. Such certificates, also referred to as client-device certificates, authenticate and authorize the client devices to access secure services from the servers. The client-device certificates assist the servers in determining that the client devices are what they claim to be.

Client-device certificates are provided to the client devices under the authority and approval of a certificate authority. The certificate authority, typically, is an external or a third party certification authority recognized for granting and provisioning of certificates. For provisioning of client-device certificates, a signing certificate is issued by the certificate authority to the server. The certificate authority generates and issues the signing certificate to declare that the possessor of the signing certificate is who the certificate claims. The server, based on the signing certificate issued by the certificate authority, provides the client-device certificates to the client devices.

For obtaining a client-device certificate, a request, also referred to as a certificate signing request, is sent by the client device to the server. The request is accompanied with an unsigned client-device certificate which is to be signed by the server. The request from the client device is processed by the server to identify and validate the identity of the client device as claimed by it for accessing the secure service hosted by the server. Based on the validation, the unsigned client-device certificate is signed by the server. The server uses the signing certificate, generated and provided by the certificate authority, for signing the client-device certificate. The signed client-device certificate is provided to the client device by the server, which allows the client device to access the secure service.

As the certificate authority is external or a third party, the process of issuing of the signing certificate is manually handled between the certificate authority and the server. The owner of the server provides information that allows the certificate authority to verify the identity of the owner. The certificate authority verifies that the owner is what is claimed in the provided information. Based on the verification, the certificate authority generates and issues the signing certificate to the server. Involvement of an external certificate authority makes the provisioning of certificates, as described above, complex and time consuming.

Further, client-device certificates may be revoked if the client devices associated with the provisioned client-device certificates are not to be allowed the access to secure services. The revocation is typically done by the certificate authority. The certificate authority maintains information of the client devices and of corresponding client-device certificates for the purposes of revocation.

Typically, when a server is presented a client-device certificate, the server communicates with the certificate authority to check whether the client-device certificate has been revoked by the certificate authority. The certificate authority maintains a certificate revocation list with details, such as serial numbers, of client-device certificates that are revoked. Based on the certificate revocation list, the certificate authority checks the validity of the client-device certificates. The certificate revocation list is substantially large that may consume a large amount of memory. In cases where the memory storing the certificate revocation list fails or is to be replaced, the certificate revocation list may no longer be available. Without the list of details of revoked client-device certificates, it is difficult to determine the validity of client-device certificates when used for accessing secure services. This may lead to undesirable grant of access to secure services even when provisioned client-device certificates have been revoked.

As the external certificate authority is relied upon for revocation of client-device certificates and for checking their validity, the methodology as described above, is complex and involves substantial processing. This may lead to delay in checking for validation of certificates against revocation.

Systems and methods for provisioning and managing of certificates in a network environment are described herein. With the systems and methods of the present subject matter, client-device certificates are provided to client devices for allowing applications in the client devices to access secure services provided by a network device, for example, a network switch, etc., in a network. For the purposes of the present subject matter, the client device includes a server that hosts applications and communicates with the network device to access secure services from the network device. In an implementation, the client device may also include a computing device, such as a laptop, a desktop computer, a smart phone, etc., hosting applications and communicating with the network device to access secure services from the network device.

The systems and methods for provisioning and managing of certificates are implemented in the network device. The network device is enabled to, in addition to performing other functions, provide and manage client-device certificates for client devices, without depending on an external certificate authority. The network device, in accordance with the present subject matter, may be referred to as the certificate provisioning and managing enabled network device.

In accordance with the present subject matter, if an application in a client device requires accessing a secure service provided by the network device, the client device has to obtain a client-device certificate before the application can access the secure service. For obtaining a client-device certificate, the client device sends a certificate signing request to the network device. The certificate signing request includes an unsigned client-device certificate to be signed by the network device.

In an implementation, the network device generates a signing certificate based on which it signs and provides client-device certificates to the client devices. The signing certificate is generated based on a root certificate in the network device. The root certificate is an anchoring certificate that facilitates in establishing substantial trust in the signing certificates branching out from it. The root certificate also facilitates in establishing trust in the client-device certificates signed using such signing certificate. The root certificate has a substantially high level of trustworthiness, and the certificates generated or signed based on the root certificate inherit the trustworthy levels of the root certificate. The network device creates and self-signs the root certificate for the purpose of generation of signing certificate.

Further, as the client-device certificates are signed based on the signing certificate and the root certificate of the network device, the network device is able to identify whether the signed client-device certificates, when presented for accessing a secure service, are signed by it. Also, the client-device certificates, provided to the client devices, are valid for use against the network device that signed and provided it. With this, for accessing a secure service from a specific network device the client device has to obtain a client-device certificate signed by that network device. This facilitates in substantially increasing the security levels of communication between the client devices and the network device.

In an implementation, when a client-device certificate is presented by the client device for accessing a secure service from the network device, the validity of the client-device certificate is checked in the network device. The validity is checked to determine whether the certificate has been revoked or is still a valid one. Based on the validity, the client device is allowed to access the secure service from the network device.

Further, the network device is provided with administrator functionalities to revoke the client-device certificates, signed and provisioned by the network device. A signed client-device certificate of a client device may be revoked by the network device for a variety of reasons including denial of accessing of a secure service to the client device, removal of the application from the client device, redeployment of the network device for another use, and such.

With the systems of the present subject matter, a substantially secure communication between a network device and client devices is achieved. Since the method to provide and manage certificates, including their revocations and validation checks, can be performed by a network device without depending on an external certificate authority, the method may be substantially simplified, and the time for provisioning of signed client-device certificates may be substantially reduced.

Further, in an implementation, information associated with the client-device certificates, signed by the network device, is stored in a certificate grant list (CGL) at the network device. When a signed client-device certificate is revoked by the network device, the information associated with the revoked signed client-device certificate is removed, or deleted from the CGL. The validity check of a signed client-device certificate, when presented for accessing of a secure service, is performed by the network device based on the information stored in the CGL.

Further, the validity checks of the signed client-device certificates are based on the information of the valid client-device certificates, and not revoked client-device certificates. Since the information associated with the revoked client-device certificate is removed from the CGL, the size of the stored information in the CGL is smaller in comparison to the typically maintained certificate revocation list. This facilitates in reducing the load on the memory of the network device.

FIG. 1 schematically illustrates a networking environment 100 implementing a certificate provisioning and managing (CPM) system 102, according to an implementation of the present subject matter. The network environment 100 may be a public networking environment or a private networking environment. As shown in FIG. 1, the CPM system 102 is implemented in a network device 104 that can provide a plurality of secure networking services. In an implementation, the network device 104 may include a network switch, a router, or other network devices within the communication network 108. The CPM system 102 in the network device 104 enables the network device 104 to provide and manage certificates in accordance with the present subject matter. For the sake of simplicity, only one network device 104 is shown in the network environment 100 in FIG. 1; however, in this or other implementations, the network environment 100 may include more than one network device implemented with the CPM system 102. The CPM system 102 may be a machine readable instructions-based implementation or a hardware-based implementation or a combination thereof.

CPM 102 may include certificate grant list 122. CGL 122 may include information associated with client-device certificates that have been signed by the network device.

CPM system 102 may include Certificate authority 114. Certificate authority 114 may manage the information stored in CGL 122, including adding newly signed client-device certificates, revoking client-device certificates, and validating client-device requests based on client-device certificates.

For the purpose of accessing secure services provided by the network device 104, a plurality of client devices 106-1, 106-2, 106-3, . . . , 106-N are communicatively coupled with the network device 104 implementing the CPM system 102. The client devices 106-1, 106-2, 106-3, . . . , 106-N, hereinafter may be collectively referred to as client devices 106, and individually referred to as a client device 106. The client device 106 may include, but is not restricted to, a server, a desktop computer, a laptop, a smart phone, a PDA, a tablet, and the like. Each of the client devices 106 hosts at least one application that can access a secure service provided by the network device 104.

In an example, the secure services provided by the network device 104 may include, but are not restricted to, selective monitoring of traffic, dynamic provisioning of access control list, hardware encryption of select traffic, certificate-based virtual private network (VPN) service, etc. Such secure services may be accessed by applications including, but not restricted to, network monitor, intrusion protection system, firewall, and the like, hosted by the client devices 106.

The network device 104 implementing the CPM system 102 can be implemented in a communication network 108. The client devices 106 are communicatively coupled to the network device 104 implementing the CPM system 102 over the communication network 108 through one or more communication links. The communication links between the client devices 106 and the network device 104 are enabled through a desired form of communication, for example, via dial-up modem connections, cable links, and digital subscriber lines (DSL), wireless or satellite links, or any other suitable form of communication.

The communication network 108 may be a wireless network, a wired network, or a combination thereof. The communication network 108 can also be an individual network or a collection of many such individual networks, interconnected with each other and functioning as a single large network, e.g., the Internet or an intranet. The communication network 108 can be implemented as one of the different types of networks, such as intranet, local area network (LAN), wide area network (WAN), the internet, and such. The communication network 108 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other.

The communication network 108 may also include individual networks, such as, but are not limited to, Global System for Communication (GSM) network, Universal Telecommunications System (UMTS) network, Long Term Evolution (LTE) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the terminology, the communication network 108 includes other network entities, such as gateways and routers; however, such details have been omitted to maintain the brevity of the description. Further, it may be understood that the communication between the network device 104 implementing the CPM system 102, the client devices 106, and other entities may take place based on the communication protocol compatible with the communication network 108.

In the communication network 108, if an application in a client device 106 has to access a secure service provided by the network device 104, the client device 106 obtains a client-device certificate, signed by the network device 104, before the application can access the secure service. For obtaining a signed client-device certificate, the client device 106 sends a certificate signing request with an unsigned client-device certificate to be signed by the network device 104. The CPM system 102 allows the network device 104 to sign the client-device certificate and provide it to the client device 106, as has been discussed in detail below.

Figure 2:
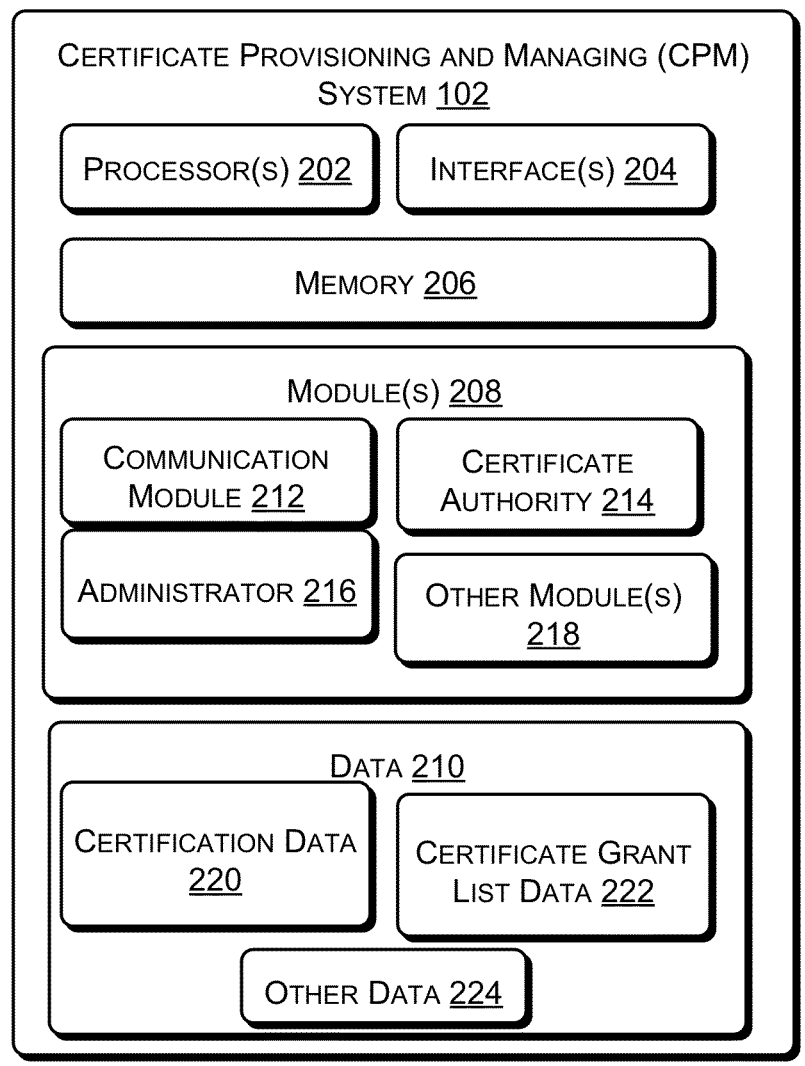
FIG. 2 illustrates the certificate provisioning and managing system, according to an example of the present subject matter.

FIG. 2 illustrates the CPM system 102, according to an implementation of the present subject matter. In an implementation, the CPM system 102 includes processor(s) 202. The processor(s) 202 may be implemented as microprocessors, microcomputers, microcontrollers, digital signal processors, central processing units, state machines, logic circuitries, and/or any devices that manipulate signals based on operational instructions. Among other capabilities, the processor(s) 202 fetch and execute computer-readable instructions stored in the memory. The functions of the various elements shown in FIG. 2, including any functional blocks labeled as "processor(s)", may be provided through the use of dedicated hardware as well as hardware capable of executing machine readable instructions.

The CPM system 102 also includes interface(s) 204. The interface(s) 204 may include a variety of machine readable instruction-based and hardware interfaces that allow the CPM system 102 and the network device 104 to interact with the client devices 106. Further, the interface(s) 204 may enable the CPM system 102 and the network device 104 to communicate with other devices, such as network entities, web servers and external repositories.

Further, the CPM system 102 includes memory 206, coupled to the processor(s) 202. The memory 206 may include any computer-readable medium including, for example, volatile memory (e.g., RAM), and/or non-volatile memory (e.g., EPROM, flash memory, etc.).

Further, the CPM system 102 includes module(s) 208 and data 210. The modules 208 may be coupled to the processor(s) 202. The module(s) 208, amongst other things, include routines, programs, objects, components, data structures, and the like, which perform particular tasks or implement particular abstract data types. The module(s) 208 further include modules that supplement applications on the CPM system 102, for example, modules of an operating system. The data 210 serves, amongst other things, as a repository for storing data that may be fetched, processed, received, or generated by the module(s) 208. Although the data 210 is shown internal to the CPM system 102, it may be understood that the data 210 can reside in an external repository (not shown in the figure), which may be coupled to the CPM system 102. The CPM system 102 may communicate with the external repository through the interface(s) 204 to obtain information from the data 210.

In an implementation, the module(s) 208 of the CPM system 102 includes communication module 212, a network device certificate authority 214, a network device administrator 216, and other module(s) 218. The network device certificate authority 214 is simply referred as certificate authority 214, and the network device administrator 216 is simply referred as administrator 216. In an implementation, the data 210 of the CPM system 102 includes certification data 220, Certificate grant list data 222, and other data 224. The other module(s) 218 may include programs or coded instructions that supplement applications and functions, for example, programs in the operating system of the CPM system 102, and the other data 224 comprise data corresponding to other module(s) 218.

The following description describes the provisioning and managing of certificates through the CPM system 102 in the network device 104 for accessing of a secure service by a client device 106, in accordance with the present subject matter, and it will be understood that the concepts thereto may be extended to provisioning and managing of certificates in the network device 104 in the communication network 108 for accessing of a plurality of secure services by more than one client device 106 in a similar manner.

For the purposes of provisioning signed client-device certificates, the certificate authority 214 creates a root certificate for the network device 104. The root certificate is self signed by the certificate authority 214 for generating further certificates in the network device 104. The self signed root certificate is indicative of identity of the network device 104 in which it is created. Certificates generated based on the root certificate, and the certificates signed using the certificates branching from the root certificate, have the identity of the network device 104.

Based on the root certificate, the certificate authority 214 generates a signing certificate which is further used to sign a certificate signing request coming from the client device 106 to allow the client device 106 to access a secure service from the network device 104. The details of the root certificate and the signing certificate are stored in the certification data 220.

For obtaining a signed client-device certificate, the client device 106 initiates to establish an encrypted, but unauthenticated, SSL connection with the network device 104. The encrypted SSL connection is established to prevent any pilferage of data being communicated over the connection. Based on the initiation of the client device 106, the communication module 212 establishes the encrypted SSL connection with the client device 106. While establishing the connection, the communication module 212 sends a network-device certificate to the client device 106. The network-device certificate is a general purpose certificate generated by the certificate authority 214 and sent from the network device 104 in order to let the client device 106 know the identity of the network device 104 with which it is communicating. The details of the network-device certificate are stored in the certification data 220.

Upon establishing the encrypted SSL connection and identifying the identity of network device 104, the client device 106 sends a certificate signing request to the network device 104, over the encrypted SSL connection. The certificate signing request includes a client-device certificate which is unsigned and is to be signed and provided by the network device 104 in order for an application in the client device 106 to access a secure service. In an example, the client-device certificate in the certificate signing request is configured such that it may be specific to the client device 106 from which it is sent. In an example, the client-device certificate may be specific to a secure service for which certification is requested. In another example, the client-device certificate may be specific to an application through which the secure service is to be accessed. The client-device certificate may be based on X.509 protocol.

The certificate authority 214 receives the certificate signing request from the client device 106. The certificate authority 214 signs the unsigned client-device certificate in the certificate signing request based on the signing certificate generated for the network device 104. The communication module 212 then provides the signed client-device certificate to the client device 106 over the encrypted SSL connection. The signed client-device certificate provided to the client device 106 may be referred to as the provisioned client-device certificate.

Once the signed client-device certificate is provisioned to the client device 106 the encrypted SSL connection between the client device 106 and the network device 104 is broken. The client device 106 then initiates to establish an application SSL connection with the network device 104 using the provisioned client-device certificate. The application SSL connection is an authenticated and encrypted connection established for the purpose of accessing of secure service provided by the network device 104. Based on the initiation of the client device 106, the communication module 212 establishes the application SSL connection with the client device 106.

In an implementation, for signing of the certificate signing request and the client-device certificate therein, the certificate authority 214 processes the certificate signing request to identify the application, the client device 106 from which the request is made, and the secure service for which the request is made. The administrator 216 validates the certificate signing request by determining whether the request is for a secure service that can be allowed access by the client device 106. Based on the validation, the administrator 216 provides an approval, and based on the administrator approval the certificate authority 214 signs the certificate signing request and the unsigned client-device certificate.

In an implementation, the certificate authority 214 incorporates or codes a network device identifier in the signed client-device certificate. The network device identifier is indicative of the identity of the network device 104. With the network device identifier in the provisioned client-device certificate, the client device 106 is able to identify the network device 104 to which it communicating for accessing the secure service. In an example, the network device identifier includes media access control (MAC) address of the network device 104.

The incorporation of network device identifier and the signing of the client-device certificate using the signing certificate of the network device 104 make the provisioned client-device certificate valid for use specifically against the network device 104. Thus, the client-device certificate, provided by the network device 104, is not usable by the client device 106 against another network device for accessing a secure service. A client device 106 can obtain signed client-device certificates from a plurality of network devices, where each of the client-device certificates is uniquely signed by the respective network device.

In an implementation, the certificate authority 214 maintains a certificate grant list in the network device 104. In the certificate grant list, the certificate authority 214 stores information associated with client-device certificates, which are signed and provided from the network device 104 to various client devices 106 and are valid (not revoked) for use against the network device 104 for accessing secure services. The information associated with the signed client-device certificate may be referred to as certificate identifying information. In an implementation, the stored certificate identifying information may include, date of signing of client-device certificate, serial number of client-device certificate and identification attribute of the client device an application specific universal unique identifier (UUID), application name, etc. In an implementation, a cryptographic code, for example SHA-1 hash code, or value, of one or more of the certificate identifying information may be stored in the certificate grant list so that the certificate grant list is securely maintained and is not modified. The hash value may further be generated with a base media access control (MAC) address of the network device, for example, CGL hash=SHA256 (UUID, serialnum, grantdate, baseMac).

The CGL may be maintained in an in-memory data store, in a flash device, or in other memory in, for example, an embedded device, in the network device, etc. There may be a maximum number of valid and granted certificates that may be stored, for example, 64, etc., based on an administrator setting, due to size constraints of the memory, etc. Thus, where the memory storing the CGL is at capacity, client-device certificate(s) may be selected for revocation.

Since the CGL stores the information of those client-device certificates signed in a specific network device 104, and utilizing the base MAC address of the network device, the CGL is not valid for another network device. The CGL may be maintained locally in the network device 104 for the purpose of validation check of the client-device certificates used for accessing the secure service provided by the network device 104. The CGL is stored in the certificate grant list data 222.

Further, the client device 106 may store the provisioned client-device certificate locally in its memory, and use the provisioned client-device certificate for subsequent accessing of the secure service from the network device 104. For accessing of the secure service using the provisioned client-device certificate, the client device 106 initiates to establish an application SSL connection with the network device 104 to send the provisioned client-device certificate to the network device 104. The communication module 212 communicates with the client device 106 to establish the application SSL connection, and the certificate authority 214 receives the provisioned client-device certificate from the client device 106. The certificate authority 214 processes the provisioned client-device certificate to determine whether the certificate was signed and provided from the network device 104. The certificate authority 214 may check the network device identifier coded in the provisioned client-device certificate. If the certificate is determined to be not the one signed and provided from the network device 104, the application SSL connection is broken.

Further, if the certificate is determined to be the one signed and provided from the network device 104, the certificate authority 214 determines whether the provisioned client-device certificate is a valid certificate for accessing of the secure service. The client-device certificate may be an invalid certificate if it has been revoked. For determining the validity, the certificate authority 214 queries the CGL. If the provisioned client-device certificate is determined to be a valid certificate then the communication module 212 allows the application in the client device 106 to access the secure service from the network device 104 over the application SSL connection. And, if the provisioned client-device certificate is determined to be an invalid certificate, due to revocation or the associated information not being present in the CGL, then the communication module 212 breaks the application SSL connection to deny the accessing of the secure service to the application in the client device 106.

Further, in an implementation, the administrator 216 may revoke the client-device certificates signed and provided from the network device 104 to the client device 106. As mentioned earlier, a client-device certificate may be revoked for a variety of reasons including denial of accessing of a secure service to the corresponding client device 106, removal of the application from the corresponding client device 106, redeployment of the network device 104 for another use, determination, based on the certificate grant date, that the certificate is outdated, etc. If a revoked client-device certificate is used by the client device 106 for accessing a secure service, the access is denied.

In at least one implementation, revocation may take place if it is determined that the CGL has reached memory capacity such that no additional newly granted client-device certificates may be stored. In such a case, the certificate authority may automatically select one or more client-device certificates to revoke, based on information associated with the client device certificate by applying rules that may be predefined by an administrator. For example, a client-device certificate may be selected for revocation based on the grant date, such that the oldest certificates are removed from the CGL in order to provide memory for storing newly granted client-device certificates. It may be appreciated that client-device certificates may be selected based on any stored information that is associated with the client-device certificate.

In an implementation, as and when a client-device certificate provisioned to the client device 106 is revoked by the administrator 216, the certificate authority 214 removes, or deletes, the certificate identifying information associated with the revoked certificate from the CGL stored in the network device 104.

Further, in an implementation, if a provisioned client-device certificate is revoked while the corresponding client device 106 and the network device 104 are communicating with each other, then the communication module 212 informs the client device 106 about the revocation of the client-device certificate provisioned to it. Based on the information of revocation, the client device 106 may accordingly remove the details of the revoked client-device certificate stored locally from its memory.

Figure 3:
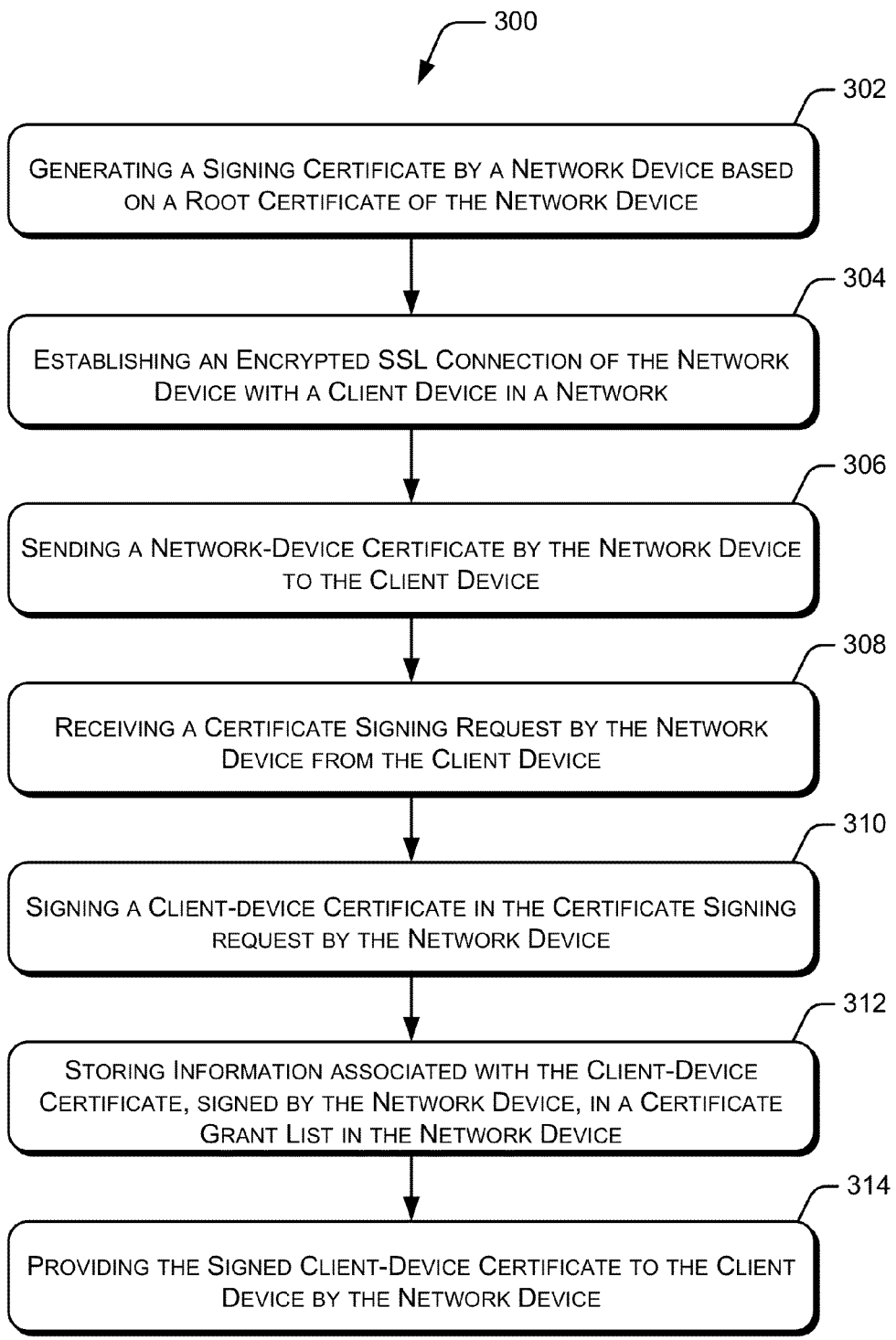
FIG. 3 illustrates a method for provisioning and managing of certificates in a network, according to an example of the present subject matter.
Figure 4:
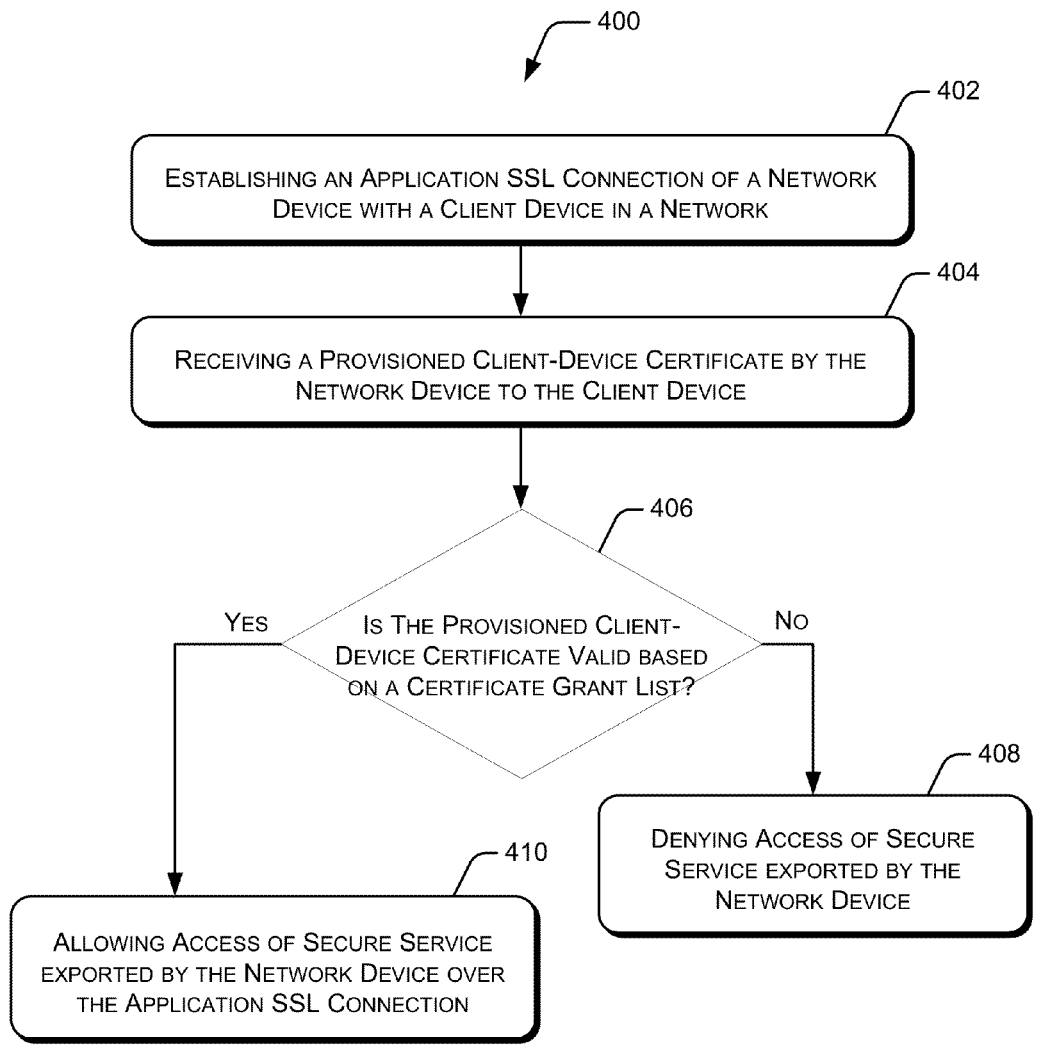
FIG. 4 illustrates a method for accessing a secure service with a provisioned client-device certificate in a network, according to an example of the present subject matter.
Figure 5:
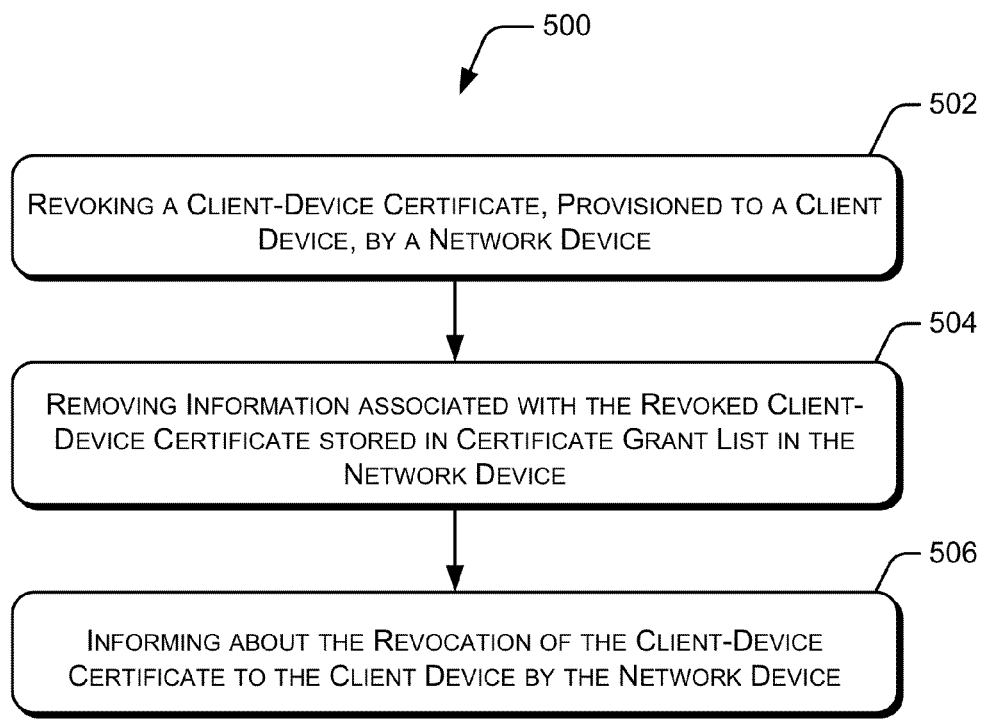
FIG. 5 illustrates a method for managing certificates in a network, according to an example of the present subject matter.

FIG. 3 illustrates a method 300 for provisioning and managing of certificates in a network, according to an implementation of the present subject matter. FIG. 4 illustrates a method 400 for accessing a secure service with a provisioned client-device certificate in a network, according to an implementation of the present subject matter. FIG. 5 illustrates a method 500 for managing certificates in a network, according to an implementation of the present subject matter. The order in which the methods 300, 400 and 500 are described is not intended to be construed as a limitation, and any number of the described method blocks can be combined in any order to implement the methods 300, 400 and 500, or an alternative method. Additionally, individual blocks may be deleted from the methods 300, 400 and 500 without departing from the spirit and scope of the subject matter described herein.

Furthermore, the methods 300, 400 and 500 can be implemented by processor(s) or computing devices in any suitable hardware, non-transitory machine readable instructions, or combination thereof. It may be understood that steps of the methods 300, 400 and 500 may be executed based on instructions stored in a non-transitory computer readable medium as will be readily understood. The non-transitory computer readable medium may include, for example, digital data storage media, digital memories, magnetic storage media, such as a magnetic disks and magnetic tapes, hard drives, or optically readable digital data storage media.

Further, although the methods 300, 400 and 500 may be implemented in network devices in different communication network environments for accessing secure services; in examples described in FIG. 3, FIG. 4 and FIG. 5, the methods 300, 400 and 500 are explained in context of the aforementioned CPM system 102 in the network device 104 in the communication network 108, for the ease of explanation.

Referring to FIG. 3, at block 302, a signing certificate is generated by the network device 104 based on a root certificate of the network device 104. The root certificate is created and self-signed by the CPM system 102 in the network device 104, and based on it the signing certificate is generated in the network device 104.

For a client device 106 to obtain a signed client-device certificate for accessing a secure service provided by the network device 104, at block 304 an encrypted SSL connection of the network device 104 with the client device 106 is established. The connection is initiated by the client device 106 and established with the CPM system 102 in the network device 104. At block 306, a network-device certificate is sent by the network device 104 to the client device 106. The network-device certificate is sent by the CPM system 102 in the network device 104, over the encrypted SSL connection. With this, the client device 106 can identify the identity of the network device 104 to which it is communicating.

After establishing the encrypted SSL connection and identity sharing, at block 308 a certificate signing request is received by the network device 104 from the client device 106. The certificate signing request is received by the CPM system 102 in the network device 104. The certificate signing request is sent by the client device 106, requesting for signing of an unsigned client-device certificate by the network device 104 for allowing the access to the provided secure service.

At block 310, a client-device certificate in the received certificate signing request is signed by the network device 104. The client-device certificate is signed by the CPM system 102 in the network device 104. As mentioned earlier, the client-device certificate is signed based on an administrator approval of the certificate signing request. For the purpose of administrator approval, the certificate signing request is processed to determine the identity of the client device 106 and to determine whether the client device 106 can be allowed to access the provided secure service.

In an implementation, a network device identifier, for example, MAC address, of the network device 104 is coded or incorporated in the signed client-device certificate. The network device identifier is coded to let the client device 106 determine the identity of network device 104 every time the secure service from the network device 104 is accessed.

At block 312, information associated with the client-device certificate, signed by the network device 104, is stored in a CGL in the network device 104. The information is stored and CGL is maintained by the CPM system 102 in the network device 104. The stored information is referred for determining the validity of any provisioned client-device certificate when used against the network device 104 for accessing the provided secure service.

After the signing of the client-device certificate, at block 314 the signed client-device certificate is provided by the network device 104 to the client device 106. The signed client-device certificate is provided over the encrypted SSL connection by the CPM system 102 in the network device 104. The client-device certificate is provided to allow the client device 106 to access the secure service provided by the network device 104. The client device 106 may store the provisioned client-device certificate in its memory and use the same for the accessing of secure service is future.

Referring to FIG. 4, for a client device 106 to access a secure service with a provisioned client-device certificate, at block 402 an application SSL connection of the network device 104 is established with the client device 106. The connection is initiated by the client device 106 and established with the CPM system 102 in the network device 104 using the provisioned client-device certificate. At block 404, the provisioned client-device certificate is received by the network device 104 from the client device 106. The provisioned client-device certificate is sent by the client device 106 and received by the CPM system 102 in the network device 104 over the application SSL connection.

At block 406, the validity of the provisioned client-device certificate is checked based on the CGL. The validity is checked by the CPM system 102 in the network device 104. As mentioned earlier, the CGL stored in the network device 104 is queried to check the validity of provisioned client-device certificate. The CGL stores information associated with the client-device certificates, signed and provided from the network device 104, which are valid and have not been revoked. If upon checking it is determined that the provisioned client-device certificate is an invalid certificate ('no' path from block 406), the accessing of secure service to the client device 106 is denied (block 408). The determination that the certificate is invalid may be because the certificate or information associated with the certificate is not present in the CGL. With this, the application SSL connection is broken and no further communication takes place between the client device 106 and the network device 104.

Alternatively, upon receipt of the request, the certificate authority may generate a hash value utilizing information included in the request, for example, one or more of the application specific UUID, application name, certificate serial number, certificate grant date, base MAC address of the network device, etc. This hash value may then be compared with the stored hash value associated with the client-device certificate in the CGL. If the two hash values do not match, then the client-device certificate may be determined invalid.

If upon checking it is determined that the provisioned client-device certificate is a valid certificate ('yes' branch from block 406), the application in the client device 106 is allowed to access the secure service provided by the network device 104 over the application SSL connection (block 410).

The client-device certificate may be determined to be valid if the certificate has been signed by the network device and if the hash value calculated upon receipt of the client-device request matches the hash value stored and associated with the client-device certificate in the CGL.

Referring to FIG. 5, for managing certificates, at block 502 a client-device certificate provided to the client device 106 is revoked by the network device 104. The client-device certificate signed and provided by the network device 104 is revoked by the administrator functionality provided by the CPM system 102 in the network device 104.

After the revocation of the provisioned client-device certificate, at block 504 the information associated with the revoked client-device certificate is removed from the CGL in the network device 104. The certificate identifying information associated with the revoked client-device certificate is removed from the CGL by the CPM system 102 in the network device 104, specifically, the certificate authority 214.

Further, at block 506, the client device 106 associated with the revoked client-device certificate is informed about the revocation. The client device 106 is informed by the CPM system 102 in the network device 104. Based on this information, the client device 106 may remove the provisioned client-device certificate and all its details from its local memory.

Figure 6:
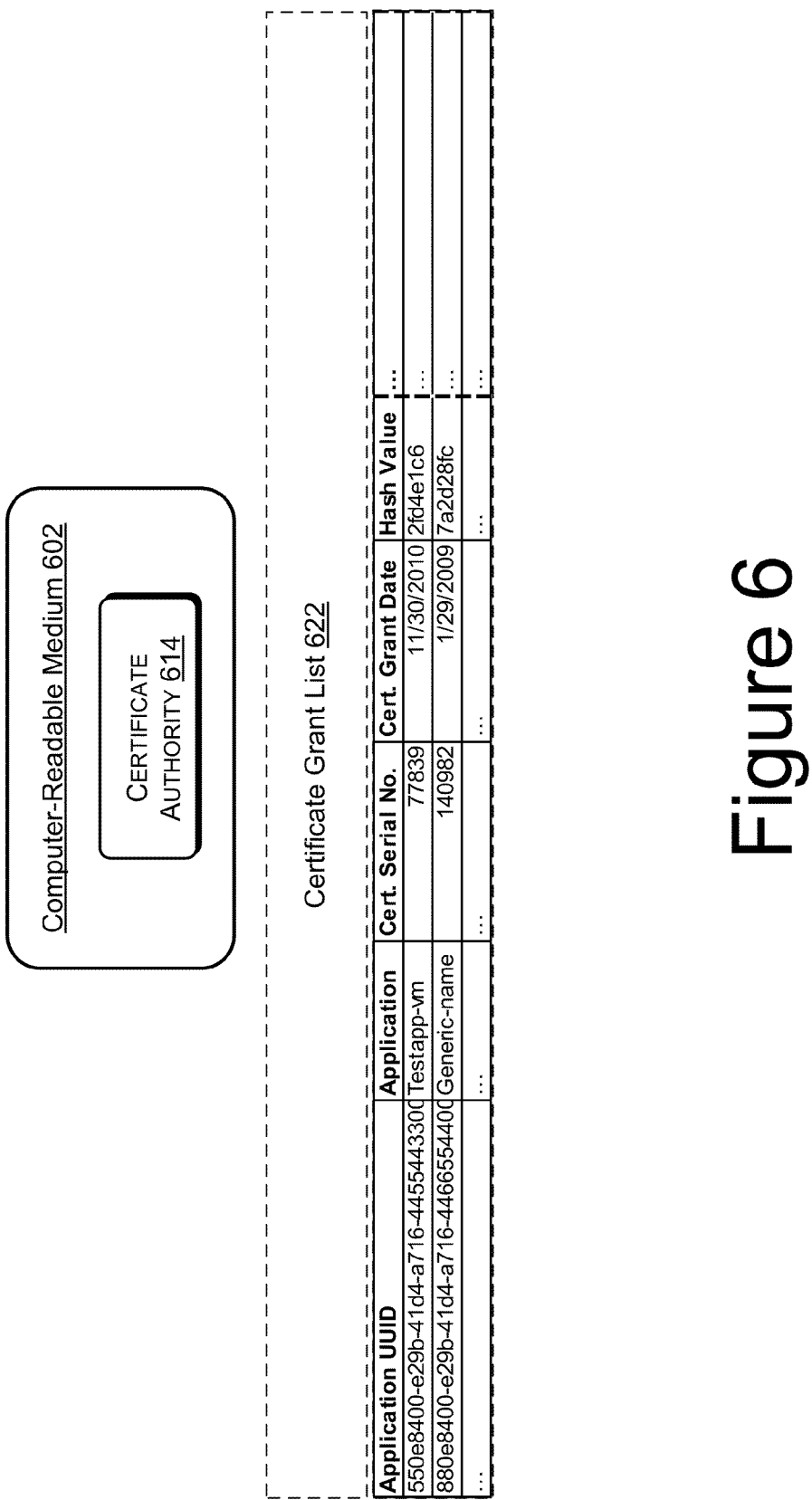
FIG. 6 illustrates a certificate authority, according to an example of the present subject matter.

FIG. 6 illustrates a computer readable medium 602 storing certificate authority 614. As mentioned above certificate authority 214, at the network device, provides, a client-device certificate to a client device thereby allowing the client device access to a secure service provided by the network device. In addition, the certificate authority 614 manages CGL 622 in memory, at the network device, by storing information associated with the client-device certificate.

The certificate authority may determine the client-device certificate for the client device should be revoked. This may be determined, for example, due to a lack of memory space in the list. The certificate authority may select one of the client-device certificates to revoke, for example, based on a certificate grant date of the client-device certificate, or on other reasons noted herein.

Upon determining a client-device certificate should be revoked, the certificate authority may manage the CGL in memory by deleting information associated with the revoked client-device certificate.

The certificate authority may then transmit notice to the client device that the client-device certificate has been revoked. Notice may be transmitted if the client device is connected. If the client device is not connected, upon future request from the client device, access to the secure service may be denied.

The certificate authority may maintain CGL at the network device, where the CGL includes a plurality of client-device certificates, each of the plurality of client-device certificates to allow a respective client device access to a secure service provided by the network device. The CGL may be modified by the addition of information associated with a newly granted client-device certificate that has been signed, and deletion of information associated with a client-device certificate that has been revoked.

The certificate authority may receive a request, from a client device, for access to a secure service, the request including an application specific universal unique identifier (UUID), an application name, a certificate serial number, and a certificate grant date. The certificate authority may generate a hash value utilizing the received information and a base media access control (MAC) address of the network device. The certificate authority may compare the generated hash value with a hash value stored in memory, where, if the generated hash value matches the stored hash value, the certificate authority may permit access to the secure service; and if the generated hash value does not match the stored hash value, the certificate authority may deny access to the secure service.

Figure 7:
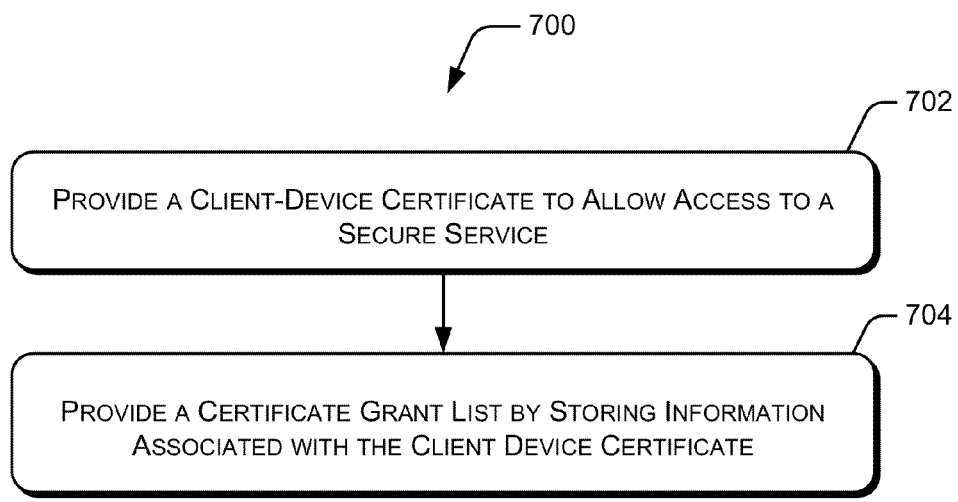
FIG. 7 illustrates a method for managing a certificate grant list, according to an example of the present subject matter.

FIG. 7 depicts an example flow diagram of steps 700 performed by the certificate authority. As shown in FIG. 7, a client-device certificate may be provided allowing the client device access to a secure service provided by the network device (702). A CGL may be managed in a memory, by storing information associated with the client-device certificate 704.

As discussed herein, by providing for the CGL in, for example, an embedded device, a maximum limit to the number of entries in a CGL may be set. In addition, by providing the CGL at the network device where an application connection authentication process may occur may enhance security of the system. Still further, by providing for a CGL, when comparing to a log or a certificate revocation list, a system administrator may have first-hand knowledge about who has signed certificates and therefore permission to access secure services at the network device. If, at any point, the CGL may be lost, corrupted, etc., any client devices wishing to access to the secure services may be re-certified.

By providing for validating a client-device certificate with the CGL as discussed herein, only applications having a corresponding valid entry in the CGL are allowed to avail the services exported by the network device, thereby securing and enhancing the process of authentication of applications by the network device.

Although embodiments for provisioning and managing of certificates in a network have been described in language specific to structural features and/or methods, it is to be understood that the present subject matter is not necessarily limited to the specific features or methods described. Rather, the specific features and methods are disclosed and explained in the context of a few examples for provisioning and managing of certificates.

We claim:

1. A method of managing a certificate grant list, the method being performed by a network device and comprising:
   providing, by the network device to a client device, a client-device certificate allowing the client device access to a secure service provided by the network device;
   signing the client-device certificate using a base media access control (MAC) address of the network device;
   storing, in a certificate grant list in a memory of the network device, a hash value associated with (i) the client-device certificate, and (ii) the base MAC address of the network device;
   receiving a request, from the client device, for access to the secure service, the request including at least one of an application specific universal unique identifier (UUID), an application name, a certificate serial number, or a certificate grant date associated with the client device;
   generating a hash value utilizing the received request and the base MAC address of the network device;
   comparing the generated hash value with the hash value stored in the certificate grant list;
   if the generated hash value matches the stored hash value, permitting access to the secure service; and
   if the generated hash value does not match the stored hash value, denying access to the secure service.

2. The method of claim 1, further comprising:
   revoking, by the network device, the client-device certificate for the client device.

3. The method of claim 2, further comprising:
   determining, by the network device, that the client-device certificate for the client device should be revoked based on the certificate grant date of the client-device certificate.

4. The method of claim 2, wherein the revoking further comprises:
   deleting, from the certificate grant list, information associated with the client-device certificate revoked by the network device.

5. The method of claim 4, wherein the revoking further comprises:
   transmitting a notice to the client device that the client-device certificate has been revoked.

6. The method of claim 1, wherein the stored hash value is previously calculated using (i) the at least one of the UUID, the certificate serial number, or the certificate grant date, and (ii) the base MAC address of the network device.

7. A network device, comprising:
   a memory to store a certificate grant list, the certificate grant list including information associated with a plurality of client-device certificates for access a secure service provided by the network device;
   a processor to implement a certificate authority, causing the processor to:
   manage the certificate grant list by (i) storing hash values associated with signed client-device certificates that have been signed by the network device using a base media access control (MAC) address of the network device, and (ii) deleting information associated with signed client-device certificates that have been revoked, wherein each of the hash values is associated with (i) a corresponding signed client-device certificate, and (ii) the base MAC address of the network device;
   receive a request, from a client device, for access to the secure service, the request including at least one of an application specific universal unique identifier (UUID), an application name, a certificate serial number, or a certificate grant date associated with the client device;
   generate a hash value utilizing the received request and the base MAC address of the network device;
   compare the generated hash value with a hash value for the client device stored in the certificate grant list;
   if the generated hash value matches the stored hash value, permit access to the secure service; and
   if the generated hash value does not match the stored hash value, deny access to the secure service.

8. The network device of claim 7, wherein implementation of the certificate authority further causes the processor to:
   generate a signing certificate based on a root certificate of the network device;

receive, from the client device, a certificate signing request comprising an unsigned client-device certificate to be signed by the network device; and sign the unsigned client-device certificate using the generated signing certificate based on the root certificate of the network device.

9. The network device of claim 8, further comprising:

a communication module coupled to the processor to:

provide the signed client-device certificate, signed by the certificate authority implemented by the processor, to the client device to allow the client device to access the secure service.

10. The network device of claim 7, wherein implementation of the certificate authority further causes the processor to:

analyze information associated with the plurality of client-device certificates to determine that a selected client-device certificate is to be revoked; and revoke the selected client-device certificate.

11. A non-transitory computer-readable medium storing instructions, executable by a processor of a network device, causing the processor to:

maintain a certificate grant list at the network device, the certificate grant list comprising a plurality of client-device certificates and a hash value associated with each of the plurality of client-device certificates, each of the plurality of client-device certificates to allow a respective client device access to a secure service provided by the network device, wherein the hash value for the respective client device is generated using a base media access control (MAC) address of the network device;

receive a request, from a respective client device, for access to the secure service, the request including at least one of an application specific universal unique identifier (UUID), an application name, a certificate serial number, or a certificate grant date associated with the respective client device;

generate a hash value utilizing the received request and the MAC address of the network device;

compare the generated hash value with the hash value for the respective client device stored in the certificate grant list;

if the generated hash value matches the stored hash value, permit access to the secure service; and if the generated hash value does not match the stored hash value, deny access to the secure service.

12. The non-transitory computer-readable medium of claim 11, wherein the executed instructions further cause the processor to:

determine that additional space in the certificate grant list is needed;

select a client-device certificate to be revoked;

revoke the selected client-device certificate by deleting the selected client-device certificate from the certificate grant list; and transmitting a notification to the client device associated with the selected client device certificate indicating that the selected client device certificate had been revoked.

\* \* \* \* \*

UNITED STATES PATENT AND TRADEMARK OFFICE
CERTIFICATE OF CORRECTION

PATENT NO.       : 9,237,021 B2  
APPLICATION NO.  : 13/895553  
DATED            : January 12, 2016  
INVENTOR(S)      : Craig Joseph Mills et al.

Page 1 of 1

It is certified that error appears in the above-identified patent and that said Letters Patent is hereby corrected as shown below:

Title page, item (71), Applicant, delete "Hewlet" and insert -- Hewlett --, therefor.

Signed and Sealed this  
Thirty-first Day of May, 2016

Michelle K. Lee  
*Director of the United States Patent and Trademark Office*